United States Patent [19]

Goloff et al.

[11] 4,161,890
[45] Jul. 24, 1979

[54] FRICTION DRIVE CONTACT ZONE

[75] Inventors: Alexander Goloff, East Peoria; Ralph E. Denning, Washington, both of Ill.

[73] Assignee: Caterpillar Tractor Co., Peoria, Ill.

[21] Appl. No.: 830,542

[22] Filed: Sep. 6, 1977

[51] Int. Cl.² .................... F16H 55/32; F16D 69/00
[52] U.S. Cl. .......................................... 74/214; 74/216; 74/229
[58] Field of Search ................ 74/214, 215, 216, 191, 74/194, 199, 192, 193, 190.5, 229, 196, 197; 29/115, 125

[56] References Cited

U.S. PATENT DOCUMENTS

| 289,368 | 11/1883 | Osborne | 74/216 |
|---|---|---|---|
| 1,246,683 | 11/1917 | Tooth | 74/191 |
| 2,281,277 | 4/1942 | Fitzgerald | 74/214 |

FOREIGN PATENT DOCUMENTS

| 102302 | 11/1937 | Australia | 74/215 |
|---|---|---|---|
| 2634244 | 7/1976 | Fed. Rep. of Germany | 74/191 |
| 398646 | 6/1909 | France | 74/194 |
| 614948 | 9/1926 | France | 74/216 |
| 343225 | 2/1931 | United Kingdom | 74/190 |
| 743881 | 5/1961 | U.S.S.R. | 74/194 |

*Primary Examiner*—Samuel Scott
*Assistant Examiner*—William R. Henderson
*Attorney, Agent, or Firm*—Phillips, Moore, Weissenberger, Lempio & Majestic

[57] ABSTRACT

In a friction type transmission two substantially rigid members are in frictional engagement at respective contact portions to provide a longitudinally extending contact zone therebetween. In some such transmissions the relative velocities of the members at a first end of the contact zone are different than at a second end thereof. This creates slippage problems. To solve these problems a plurality of generally parallel plates are aligned in a pack and are arranged whereby an edge of the aligned plates forms the aforementioned contact portion of at least one of the inelastic members. Slippage is thereby prevented.

26 Claims, 12 Drawing Figures

U.S. Patent  Jul. 24, 1979  Sheet 1 of 2  4,161,890
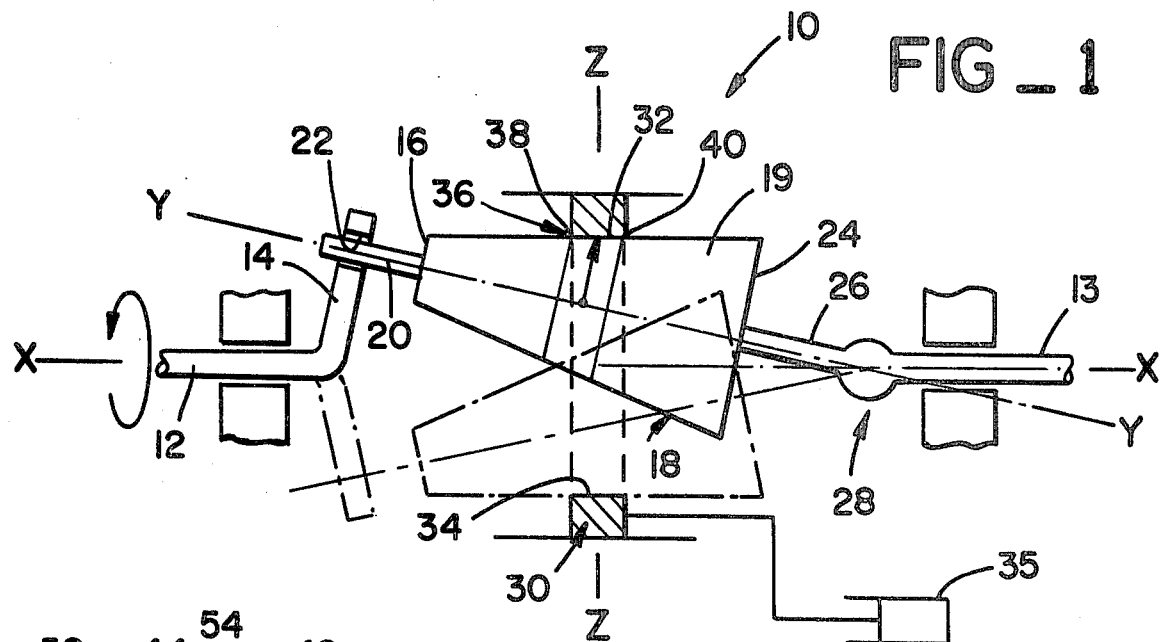
FIG_1
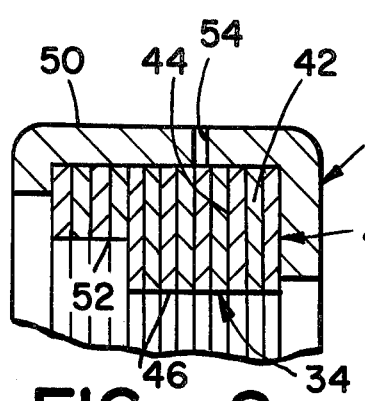
FIG_2
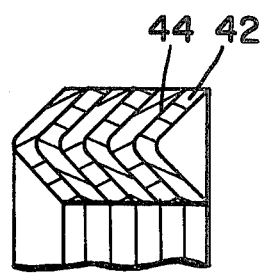
FIG_3
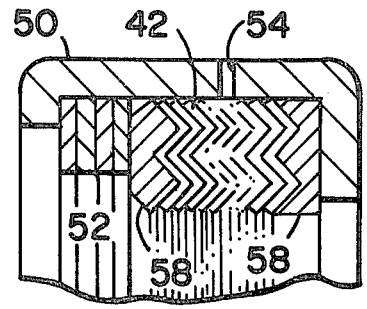
FIG_4
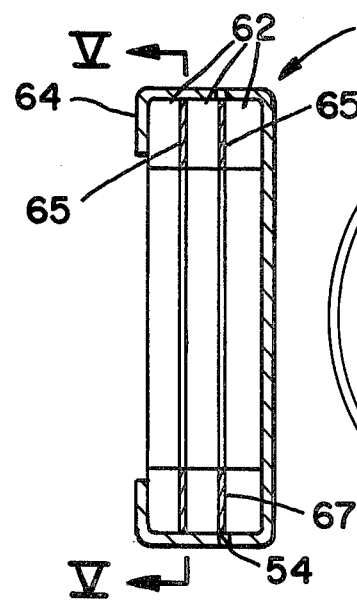
FIG_6
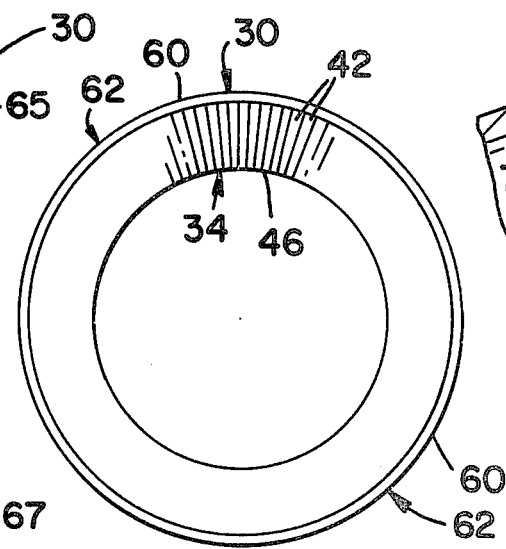
FIG_5
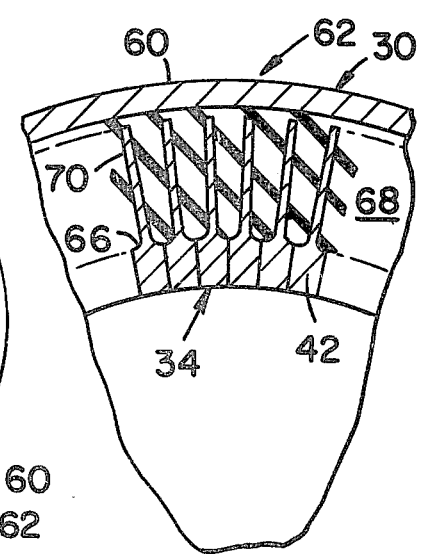
FIG_7

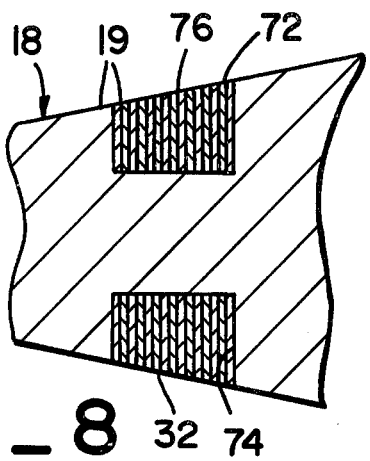
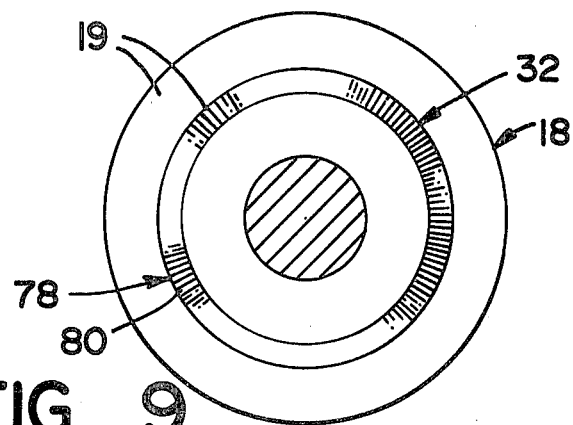
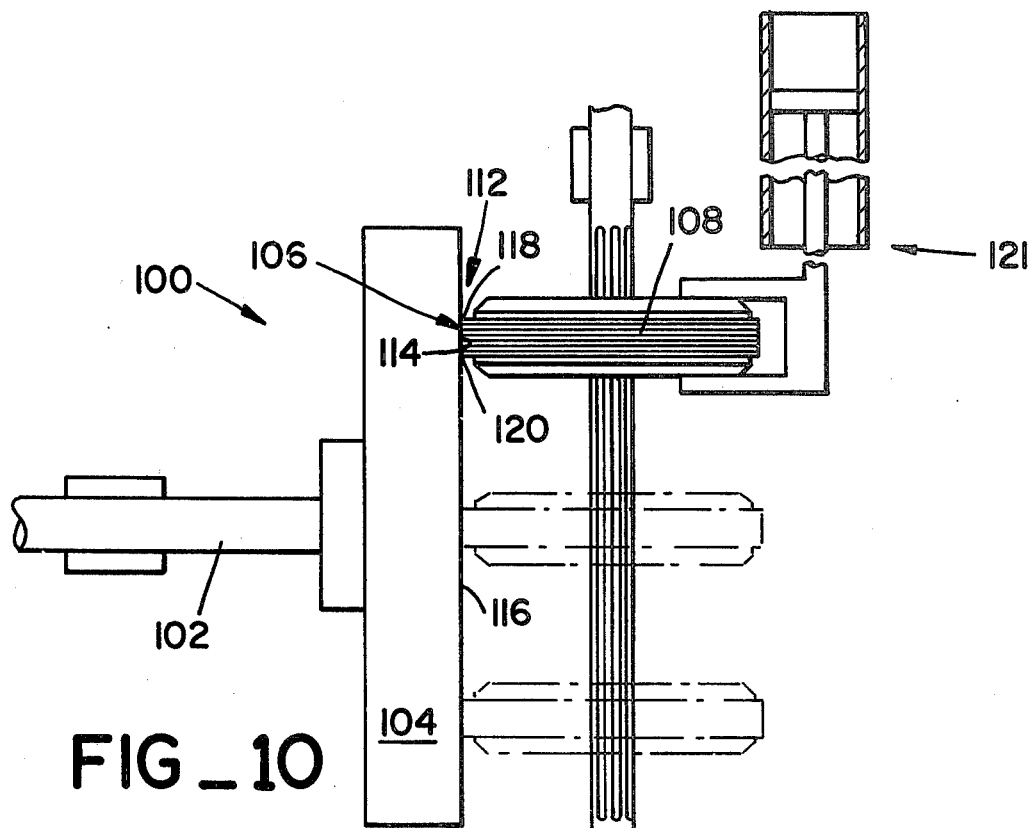
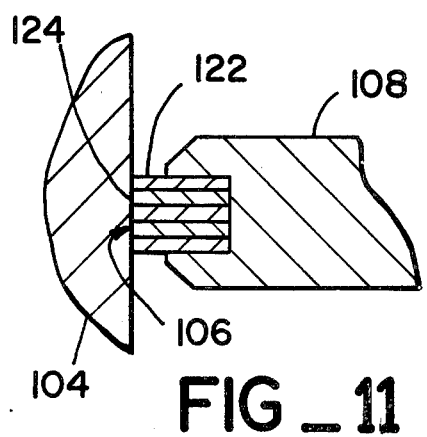
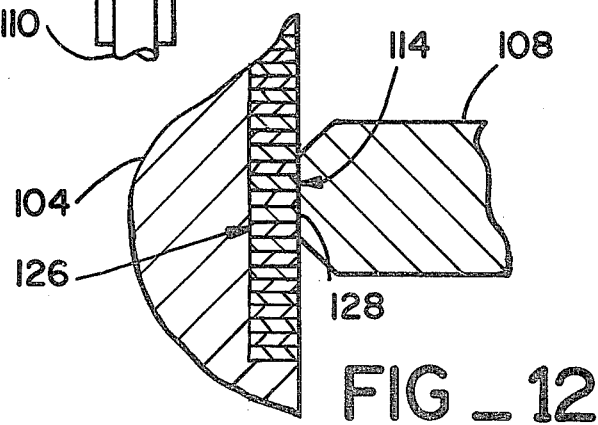

FRICTION DRIVE CONTACT ZONE

BACKGROUND OF THE INVENTION

1. Field of the Invention

The invention relates to friction drive type power transmitting arrangements wherein two substantially inelastic members are in frictional engagement over a longitudinally extending contact zone with the members moving at different relative speeds at the ends of the contact zones. More particularly the invention is concerned with solving the problem of slippage which occurs in such transmitting arrangements.

2. Prior Art

Power transmitting arrangements are well known wherein power is transmitted through frictional engagement. In one such typical arrangement power is transmitted to a conically shaped member by nutating it in frictional engagement with the inner diameter of a ring. The apex end of the cone is moved in a circle through use of a crank driven by an input shaft with the apex end of the cone being freely rotatable in the crank. The base end of the cone then connects to a universal joint coaxial with the input shaft and thereby transmits power to an output shaft. Generally the aforementioned ring can be moved towards and away from the input and output shafts to thereby vary the speed and power transmission characteristics of the transmission. In such transmissions a problem arises in that the conical surface which is contacting the inner surface of the ring must have different speeds relative to the ring as a function of the axial positions on the ring which it contacts. Thus, in the simplest case it can be seen that the relative velocity between the conical surface and the ring where the conical surface contacts a first end of the ring must be different than the relative velocity between the ring and the conical surface where it contacts the second end of the ring. It is also clear that this will lead to serious slippage problems which generally promote wear. It is clear that contact stresses are necessary to carry torque from the ring to the cone and that the higher the contact stresses and the higher the rotating speed, the greater is the amount of heat and, hence, wear, generated within the contact zone due to the skidding phenomenon. It would be highly desirable to reduce such wear and greatly reduce or even eliminate slipping or skidding between the two contacting members, in the example discussed above the ring and the cone, and thereby decrease the heat generated within the contact zone and the amount of wear of the components.

SUMMARY OF THE INVENTION

The present invention is directed to overcoming one or more of the problems as set forth above.

According to the present invention there is provided an improvement in a friction drive type power transmitting arrangement which comprises first and second substantially rigid members with respective contact portions of said members in frictional engagement at a longitudinally extending contact zone and means for causing a relative velocity of said members at a first end of said contact zone to be different than a relative velocity of said members at a second end of said contact zone. The improvement comprises a plurality of generally parallel plates aligned surface to surface with a respective edge of each plate forming a continuous surface with a respective edge of an adjacent plate and means for mounting the plates to a respective one of the first and second members with the edges of the plates forming a respective contact portion thereof.

BRIEF DESCRIPTION OF THE DRAWING

The invention will be better understood by reference to the figures of the drawings wherein like numbers denote like parts throughout and wherein:

FIG. 1 illustrates, schematically, a power transmission wherein power is transmitted via friction at an elongated contact zone and wherein the contacting members are moving at different speeds relative to each other at the ends of the contact zone;

FIG. 2 illustrates schematically, a first embodiment of the improvement of the present invention useful in the power transmission of FIG. 1;

FIG. 3 illustrates a second embodiment of an improvement in accordance with the present invention useful in the power transmission of FIG. 1;

FIG. 4 illustrates a third embodiment in accordance with the present invention useful in the power transmission of FIG. 1;

FIG. 5 illustrates a fourth embodiment in accordance with the present invention useful in the power transmission of FIG. 1;

FIG. 6 illustrates a fifth embodiment in accordance with the present invention useful in the power transmission of FIG. 1;

FIG. 7 illustrates a sixth embodiment in accordance with the present invention useful in the power transmission of FIG. 1;

FIG. 8 illustrates a seventh embodiment in accordance with the present invention useful in the power transmission of FIG. 1;

FIG. 9 illustrates an eighth embodiment in accordance with the present invention useful in the power transmission of FIG. 1;

FIG. 10 illustrates schematically, a second type of power transmission wherein power is transmitted via friction at an elongated contact zone and wherein the contacting members are moving at different speeds relative to each other at the ends of the contact zone;

FIG. 11 illustrates a first embodiment of the improvement of the present invention useful in the power transmission of FIG. 10; and FIG. 12 illustrates a second embodiment of the improvement of the present invention useful in the power transmission of FIG. 10.

DETAILED DESCRIPTION OF THE PREFERRED EMBODIMENTS

While the invention will be primarily described in terms of a very particular power transmission arrangement, namely a conical member which is in frictional contact with a ring and which nutates therewithin, it should be clearly understood that the present invention is not limited to such a system and is equally useful with any power transmission system wherein power is transmitted via frictional engagement between two members having relative motion therebetween and wherein the two members are in contact over a longitudinally extending contact zone and further wherein the speed of contact between the two members at the contact zone is not the same for all positions along that contact zone at any one moment of time. For example, FIGS. 10–12 illustrate an orthogonal type friction drive having the above characteristics.

Adverting to FIG. 1 there is illustrated therein a friction drive type transmission 10 which serves for transmitting rotary motion from an input shaft 12 to an output shaft 13. In brief, as the input shaft 12 rotates this causes a crank 14 to rotate therewith. A first or apex end 16 of a truncated conical member 18 having a conical surface 19 has a rod 20 extending therefrom into a bearing 22 in the crank 14. Thus, as the crank 14 rotates under the impetus of the input shaft 12 the apex end 16 of the truncated cone 18 can rotate with the bearing 22 and is carried around in a relatively large circle by the bearing 22. A second or base end 24 of the conical member 18 has a rod 26 extending therefrom along the axis of the conical member 18 to a constant velocity (universal) joint 28 with the output shaft 13. It is noted that the input shaft 12 and the output shaft 13 are coaxial for proper operation of such a transmission. A ring 30 is arranged coaxially with the input shaft 12 and output shaft 13 and in position to be in frictional engagement with a contact portion 32 of the outer surface of the conical member 18. Thus, it is clear that a contact portion 34 of the ring 30 and the contact portion 32 of the conical member 18 serve for transmission via frictional engagement of power from the input shaft 12 to the output shaft 13. The ring 30 can generally be moved leftwardly or rightwardly, for example, under the impetus of a hydraulic motor 35 as illustrated schematically in FIG. 1 to allow for change in speed operation of the transmission 10.

It will be apparent that a longitudinally extending contact zone 36 will then be created between the contact portions 32 and 34 of the conical member 18 and the ring 30 respectively. It is further clear that as the conical member 18 nutates within the ring 30, the relative velocities of the ring 30 and the conical member 18 will be caused by the relative shapes of the members, namely by the conical shape of the conical member 18, to be different at a first end 38 of the contact zone 36 than it is at a second end 40 of the contact zone 36. Thus, for example, the first end 38 of the contact zone 36 must exhibit some slipping or skidding if the second end 40 of the contact zone 36 is moving at a maximum nonskid velocity.

The present invention relates particularly to improvements in the ring 30 or alternatively in the conical member 18 which virtually eliminates the skidding of the conical member 18 on the ring 30. In the particular embodiment as discussed herein this improvement will be primarily discussed for the sake of convenience as a change in structure of the ring 30.

Adverting to FIG. 2, there is illustrated a plurality of generally parallel plates 42 which are aligned with lateral surfaces 44 thereof in surface to surface contact and with a respective edge 46 of each of the plates 42 generally forming a continuous surface with a respective edge 46 of an adjacent plate 42. Thus an overall stack 48 of washers 42 is provided. In the embodiment illustrated in FIG. 2 each of the plates 42 comprises a rotatable annular (washer-like) plate which is coaxial with the ring 30 and the inner edges of the aforementioned discs comprise the contact portion 34 of the ring 30 whereby each respective annular plate rotates at a velocity determined by a corresponding contacting area of the contact portion 32 of the conical roller 18. In such an arrangement power is transmitted through frictional engagement of the abutting generally parallel lateral surfaces 44 of the parallel plates 42.

Means are provided for mounting the plates 42 or more particularly the stack 48 thereof to the ring 30. In the embodiment of FIG. 2 the mounting means comprises a mounting clamp 50 which fits about the stack 48 of plates 42 in a manner whereby the mounting clamp 50 along with the stack 48 forms the ring 30. In addition to the mounting clamp 50 there is provided a plurality of Belleville washers 52 compressed between the clamp 50 and the stack 48 of plates 42. Thus, the Belleville washers 52 serve as means for axially compressing the plates 42 against one another. Lubricant normally fills the transmission 10. This provides lubrication between the contact portions 34 and 32 as well as between the plates 42. However, introduction of lubricant under pressure to between the plates 42 may also be desirable to insure adequate lubrication in this area. A duct 54 in the mounting clamp 50 provides means for introducing a lubricant under pressure between the respective plates 42. It will be noted that in the embodiment of FIG. 2 the plates 42 are generally flat.

Referring now to the alternate embodiment of FIG. 3, it is noted that this embodiment varies from the embodiment of FIG. 2 only in that the plates 42 are corrugated rather than flat. This allows additional surface area for contact between the respective lateral surfaces 44 of adjacent plates 42 whereby additional frictional contact is assured. For clarity the mounting clamp 50 and Belleville washers 52 along with the duct 54 are omitted from FIG. 3.

Referring now to FIG. 4 there is illustrated an alternate embodiment of the present invention wherein highly corrugated very thin plates 42 are utilized and wherein in this embodiment load distributing washers 58 are added to assure that the load is properly distributed over the very thin plates 42. Lubrication is provided also in this embodiment and is indeed especially important in this embodiment.

Adverting to FIG. 5 there is illustrated yet another alternate embodiment of the present invention. In the embodiment illustrated in FIG. 5 the plates 42 are not annular and washer-like but instead extend radially and axially of the ring 3 and the inner edges 46 of each of the plates 42 comprise a contact portion 34 of the ring 30. In this embodiment of the present invention means are provided for elastically radially shifting the plates 42 responsive to contact with different areas of the conical surface contact portion 32 of the conical roller 18. In the embodiment of FIG. 5 the plates 42 are held within a somewhat flexible annular member 60 whereby partially through the flexibility of the member 60 and partially through the elasticity of the plates 42 themselves or completely due to either elastic shifting means, the plates 42 can in effect be shifted when the contact portion 34 of the ring 30 contacts the contact portion 32 of the conical roller 18. The annular member 60 along with the plates 42 as illustrated in FIG. 5 thus form a pack 62 which can serve as the ring 30.

Adverting now to FIG. 6 there is illustrated therein a ring 30 which comprises a plurality, namely three of the packs 62 stacked against one another and held in place by a clamp 64. In the embodiment of FIG. 6 it is clear that each of the packs 62 can be considered equivalent to the plates 42 illustrated in FIG. 2. Thus, it is clear that each of the packs 62 can at least potentially rotate relative to an adjacent pack 62 whereby frictional engagement will result between adjacent surfaces 65 of the packs 62 while at the same time within each one of the packs 62 elastic radial shifting of the plates 42 therein can occur. Flat hardened washers can be provided between each pack 62 to prevent interlocking of the packs 62 due to interference between individual plates 42 of adjacent packs 62.

Adverting now to FIG. 7 there is illustrated therein yet another embodiment of the present invention wherein each of the plates 42 is arranged or aligned exactly as in the embodiment shown in FIG. 5. In the embodiment of FIG. 7, however, the annular member 60 of the ring 30 is spaced from respective outer edges 66 of the plates 42 and an elastomeric matrix 68 fills the space between the outer edges 66 of the plates 42 and the annular member 60. The elastomeric matrix then serves as the aforementioned means for elastically radially shifting the plates 42 responsive to contact with different areas of the conical surface contact portion 32 of the conical roller 18. As will further be noted by reference to FIG. 7 the plates 42 preferably each include an anchor 70 extending radially and axially from the outer edge 66 thereof and into the matrix 68 with the anchors 70 terminating within the matrix 68. It is clear that the anchors 70 can thus readily interact with the matrix 68 to provide a most efficient means for elastically radially shifting the plates 42. It should further be noted that the embodiment of FIG. 7 can be formed into a pack 62 just as can be the embodiment of FIG. 5 and that the packs 62 of FIG. 7 are useful in the embodiment illustrated in FIG. 6.

Referring to FIG. 8, there is illustrated an embodiment wherein a plurality of parallel plates 72 are positioned in a cavity 74 in the conical member 18 and wherein the edges 76 of the plates 72 serve to form the contact portion 32 of the conical member 18. The parallel plates 72, as illustrated, comprise rotatable discs having edges 76 in the form of a truncated cone whereby the edges 76 form a part of the conical surface 19. Operation is as with the embodiments of FIGS. 2, 3 and 4.

Referring to FIG. 9, there is illustrated an embodiment wherein a plurality of parallel plates 78 are positioned in radially and axially extending alignment with edges 80 thereof forming the contact portion 32 of the conical member 18. The parallel plates 78, as illustrated, have the edges 80 thereof in the form of axially extending portions of the conical surface 19. Means are provided for elastically circumferentially shifting the plates 78 responsive to contact with different areas of the ring 30. Basically, the plates 78 are made of a sufficiently elastic material to allow shifting thereof when the contact portion 32 of the conical roller 18 contacts the contact portion 34 of the ring 30.

Referring to FIG. 10, a power transmission 100 is illustrated wherein orthogonal drive is provided. Briefly, an input shaft 102 drives a drive disc 104. The disc 104 frictionally engages a circumferential contact portion 106 of a driven disc 108 which is contacted to drive a coaxial output shaft 110. A contact zone 112 is formed between the contact portion 106 of the driven disc 108 and a contact portion 114 on a lateral surface 116 of the drive disc 104. It will be noted that a first end 118 of the contact portion 114 moves at a faster rate, relative to the contact portion 106, than does a second end 120 of the contact portion 114. This, of course, follows from the different radial separations of the first end 118 and second end 120 of the contact portion 114 from the center of the drive disc 104. Hence, just as with the power transmission 10 of FIGS. 1–9 slippage is a problem. Change speed operation is controlled by hydraulic motor-fork arrangement 121 which is shown schematically.

FIG. 11 illustrates an embodiment wherein the driven disc 108 includes a plurality of coaxial annular washer-like plates 122 having edges 124 which form the circumferential contact portion 106 of the driven disc 108. Operation is as with the embodiments of FIGS. 1–4. Radially and axially extending parallel plates of the types illustrated in FIGS. 5 and 6 can also be used to form the contact portion 106 of the driven disc 108.

FIG. 12 illustrates the use of a plurality of rings 126 having edges 128 which form the contact portion 114 of the driving disc 104. Operation is again generally as with the embodiments of FIGS. 1–4. Again, radially and axially extending parallel plates of the types illustrated in FIGS. 5 and 6 can be used to form the contact portion 114 of the driving disc 104.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a friction drive type power transmitting arrangement which comprises first and second substantially rigid members with respective contact portions of said members in frictional engagement at a longitudinally extending contact zone and means for causing a relative velocity of said members at a first end of said contact zone to be different than a relative velocity of said members at a second end of said contact zone, an improvement comprising:
   a plurality of generally parallel plates aligned surface to surface with a respective edge of each plate forming a continuous surface with a respective edge of an adjacent plate; and
   means for mounting said plates to a respective one of said first and second members with said edges of said plates forming a respective contact portion thereof.

2. An improvement as in claim 1, wherein said first member comprises a stationary ring, said contact portion of said ring comprises an inner surface thereof, said second member comprises a conically surfaced roller within said ring, said contact portion of said roller comprises said conical surface of said roller and said mounting means mount said plates to said ring and including:
   means for nutating said roller about an axis of said ring while allowing rotation of said roller about an axis thereof with said contact zone instantaneously comprising an axially extending region on said inner surface of said ring and a corresponding axially extending region on said conical surface.

3. An improvement as in claim 2, wherein said plates each comprise a rotatable disc coaxial with said ring and said inner edges of said discs comprise said contact portion of said ring whereby each respective disc rotates at a velocity determined by a corresponding contacting area of said conical surface and power is transmitted through frictional engagement of abutting parallel surfaces of said discs.

4. An improvement as in claim 3, including means for introducing a lubricant between adjacent discs.

5. An improvement as in claim 3, including means for axially compressing said discs against one another.

6. An improvement as in claim 5, wherein said discs are generally flat.

7. An improvement as in claim 5, wherein said discs are corrugated.

8. An improvement as in claim 2, wherein said plates extend radially and axially of said ring and said inner edges of said plates comprise said contact portion of said ring and including:
   means for elastically radially shifting said plates responsive to contact with different areas of said conical surface contact portion of said roller.

9. An improvement as in claim 8, including a plurality of packs of said plates, each of said packs comprising a rotatable disc coaxial with said ring and respective inner edges of said discs corresponding to inner edges of said plates whereby each respective disc rotates at a velocity determined by a corresponding contacting area of said conical surface and power is transmitted through frictional engagement of abutting parallel surfaces of said discs.

10. An improvement as in claim 9, including means for introducing a lubricant between adjacent discs.

11. An improvement as in claim 9, including means for axially compressing said discs against one another.

12. An improvement as in claim 11, wherein said discs are generally flat.

13. An improvement as in claim 8, wherein respective outer edges of said plates are spaced from said ring and including:
   an elastomeric matrix filling the space between said outer edges of said plates and said ring.

14. An improvement as in claim 13, wherein said plates include anchors extending radially and axially from said outer edges thereof into said matrix, said anchors terminating within said matrix.

15. An improvement as in claim 14, including a plurality of packs of said plates, each of said packs comprising a rotatable disc coaxial with said ring and respective inner edges of said discs corresponding to inner edges of said plates whereby each respective disc rotates at a velocity determined by a corresponding contacting area of said conical surface and power is transmitted through frictional engagement of abutting parallel surfaces of said discs.

16. An improvement as in claim 15, including means for introducing a lubricant between adjacent discs.

17. An improvement as in claim 15, including means for axially compressing said discs against one another.

18. An improvement as in claim 17, wherein said discs are generally flat.

19. An improvement as in claim 1, wherein said plates are mounted with the edge thereof substantially parallel to the relative direction of motion between said contact portions.

20. An improvement as in claim 1, wherein said plates are mounted with the edges thereof substantially perpendicular to the relative direction of motion between said contact portions.

21. An improvement as in claim 1, wherein said first member comprises a drive disc, said contact portion of said drive disc comprises a lateral surface thereof, said second member comprises a driven disc orthogonal to said drive disc, said contact portion of said driven disc comprises a circular circumference thereof and said mounting means mounts said plates to said driven disc.

22. An improvement as in claim 21, wherein said plates are mounted with the edges thereof substantially parallel to the relative direction of motion between said contact portions.

23. An improvement as in claim 1, wherein said plates comprise a plurality of annular washer-like plates coaxial with said driven disc.

24. An improvement as in claim 1, wherein said first member comprises a drive disc, said contact portion of said drive disc comprises a lateral surface thereof, said second member comprises a driven disc orthogonal to said drive disc, said contact portion of said driven disc comprises a circular circumference thereof and said mounting means mounts said plates to said drive disc.

25. An improvement as in claim 24, wherein said plates are mounted with the edges thereof substantially parallel to the relative direction of motion between said contact portions.

26. An improvement as in claim 25, wherein said plates comprise a plurality of rings coaxial with said drive disc.

* * * * *

Disclaimer 4,161,890.—*Alexander Goloff*, East Peoria, and *Ralph E. Denning*, Washington, Ill. FRICTION DRIVE CONTACT ZONE. Patent dated July 24, 1979. Disclaimer filed Nov. 7, 1980, by the assignee, *Caterpillar Tractor Co.*

Hereby enters this disclaimer to claims 1, 2, 19 and 21–26 of said patent.

[*Official Gazette December 23, 1980*]